United States Patent
Nguyen

(10) Patent No.: US 9,797,337 B2
(45) Date of Patent: Oct. 24, 2017

(54) OIL-COOLED PISTON FOR AN INTERNAL COMBUSTION ENGINE

(71) Applicant: MAHLE International GmbH, Stuttgart (DE)

(72) Inventor: Giang The Nguyen, Northville, MI (US)

(73) Assignee: MAHLE International GmbH, Stuttgart (DE)

( * ) Notice: Subject to any disclaimer, the term of this patent is extended or adjusted under 35 U.S.C. 154(b) by 79 days.

(21) Appl. No.: 14/795,966

(22) Filed: Jul. 10, 2015

(65) Prior Publication Data

US 2017/0009699 A1    Jan. 12, 2017

(51) Int. Cl.
| | | |
|---|---|---|
| *F02F 3/00* | (2006.01) | |
| *F02F 3/16* | (2006.01) | |
| *F16J 1/09* | (2006.01) | |
| *F01P 3/00* | (2006.01) | |
| *F01P 3/10* | (2006.01) | |
| *F02F 3/22* | (2006.01) | |

(52) U.S. Cl.
CPC ............. *F02F 3/0069* (2013.01); *F01P 3/10* (2013.01); *F02F 3/22* (2013.01); *F16J 1/09* (2013.01)

(58) Field of Classification Search
CPC .......... F02F 3/0069; F02F 3/0076; F02F 3/16; F02F 3/20; F02F 3/22; F16J 1/04; F16J 1/08; F16J 1/09; F16J 1/16; F01P 3/00; F01P 3/06; F01P 3/10; F01P 2003/001; F01P 2003/006

USPC ......... 123/41.01, 41.34, 41.35, 41.42, 197.2, 123/193.1, 193.6, 196 R, 196 AB; 92/172, 174, 176, 186

See application file for complete search history.

(56) References Cited

U.S. PATENT DOCUMENTS

| | | | |
|---|---|---|---|
| 2,742,883 A | 4/1956 | Smith | |
| 3,215,130 A | 11/1965 | Maier | |
| 3,613,521 A | 10/1971 | Itano | |
| 3,805,677 A | 4/1974 | Clary et al. | |
| 4,056,044 A * | 11/1977 | Kamman | F02F 3/0069 123/41.35 |
| 4,073,220 A * | 2/1978 | Guenther | F02B 23/0696 123/193.6 |

(Continued)

FOREIGN PATENT DOCUMENTS

| | | |
|---|---|---|
| DE | 102014010503 | 1/2015 |
| EP | 0359932 | 3/1990 |

(Continued)

*Primary Examiner* — Grant Moubry
(74) *Attorney, Agent, or Firm* — Reisling Ethington P.C.

(57) ABSTRACT

A piston for an internal combustion engine. The piston comprises a piston head and an articulated piston skirt. The piston head includes a crown and pin bosses depending from the crown. The piston skirt includes opposed thrust walls, opposed sidewalls, and a transverse bridge extending diametrically across the piston skirt, between the opposed sidewalls. A circumferential cooling gallery is encompassed within an outer circumferential ring belt section of the crown and is in fluid communication with a central cooling passage that extends between the crown and the piston skirt. The central cooling passage extends diametrically across the piston skirt, beneath at least a portion of the ring belt section and beneath at least a portion of an inner combustion bowl section of the crown.

27 Claims, 3 Drawing Sheets

(56) References Cited

U.S. PATENT DOCUMENTS

| | | | |
|---|---|---|---|
| 4,180,027 A | 12/1979 | Taylor | |
| 4,377,967 A * | 3/1983 | Pelizzoni | F01M 1/08 123/41.35 |
| 4,502,422 A * | 3/1985 | Brann | F01P 3/08 123/193.6 |
| 4,505,233 A * | 3/1985 | Kanda | F01P 3/10 123/193.6 |
| 4,506,632 A * | 3/1985 | Kanda | F01M 1/08 123/193.6 |
| 4,530,312 A * | 7/1985 | Kanda | F02F 3/0076 123/193.6 |
| 4,587,932 A | 5/1986 | Moebus | |
| 4,941,440 A * | 7/1990 | Weber | F02B 23/0696 123/193.6 |
| 5,040,454 A * | 8/1991 | Ballheimer | F02F 3/0069 123/193.6 |
| 5,052,280 A * | 10/1991 | Kopf | F02F 3/22 123/41.35 |
| RE34,139 E * | 12/1992 | Cooper | F02F 3/0069 123/193.6 |
| 5,317,958 A * | 6/1994 | Martins Leites | B21K 1/185 123/193.6 |
| 5,483,869 A * | 1/1996 | Bock | F02B 23/0696 123/193.6 |
| 5,839,352 A * | 11/1998 | Ribeiro | F02F 3/26 123/193.6 |
| 5,913,960 A * | 6/1999 | Fletcher-Jones | F02F 3/0015 123/193.4 |
| 6,371,061 B2 * | 4/2002 | Lash | F01P 3/08 123/193.6 |
| 6,840,155 B2 * | 1/2005 | Ribeiro | B21K 1/18 92/186 |
| 7,210,399 B2 * | 5/2007 | Ioja | F16J 1/04 92/216 |
| 7,870,669 B2 * | 1/2011 | Ribeiro | B21K 1/18 29/888.05 |
| 8,087,395 B2 | 1/2012 | Scharp et al. | |
| 8,146,560 B2 | 4/2012 | Scharp et al. | |
| 8,161,934 B2 | 4/2012 | Scharp et al. | |
| 8,161,935 B2 | 4/2012 | Bing et al. | |
| 8,267,005 B2 | 9/2012 | Scharp et al. | |
| 8,544,442 B2 | 10/2013 | Scharp et al. | |
| 8,584,626 B2 * | 11/2013 | Jacobi | F02F 3/18 123/193.1 |
| 8,631,781 B2 | 1/2014 | Boczek et al. | |
| 8,776,670 B2 * | 7/2014 | Lapp | F02F 3/003 92/186 |
| 8,939,114 B2 * | 1/2015 | Keller | F02F 3/22 123/193.6 |
| 8,973,484 B2 * | 3/2015 | Scharp | F02F 3/003 92/186 |
| 8,973,548 B2 | 3/2015 | Andreas | |
| 8,978,612 B2 * | 3/2015 | Nyberg | F02F 3/0069 123/193.6 |
| 9,068,529 B2 * | 6/2015 | Linke | F02F 3/22 |
| 2009/0151555 A1 * | 6/2009 | Lapp | F02F 3/003 92/172 |
| 2010/0139480 A1 * | 6/2010 | Ohmori | F02F 3/00 92/239 |
| 2011/0185889 A1 | 8/2011 | Muscas | |
| 2011/0203547 A1 * | 8/2011 | Gildemeister | F16J 1/09 123/197.2 |
| 2012/0000439 A1 | 1/2012 | Scharp et al. | |
| 2012/0240881 A1 | 9/2012 | Scharp et al. | |
| 2014/0102294 A1 | 4/2014 | Klein | |
| 2014/0197142 A1 | 7/2014 | Wilder | |

FOREIGN PATENT DOCUMENTS

| | | | |
|---|---|---|---|
| EP | 0397710 B1 * | 11/1993 | F02B 23/0696 |
| JP | 2014095304 | 5/2014 | |
| WO | 2014001256 | 1/2014 | |

* cited by examiner

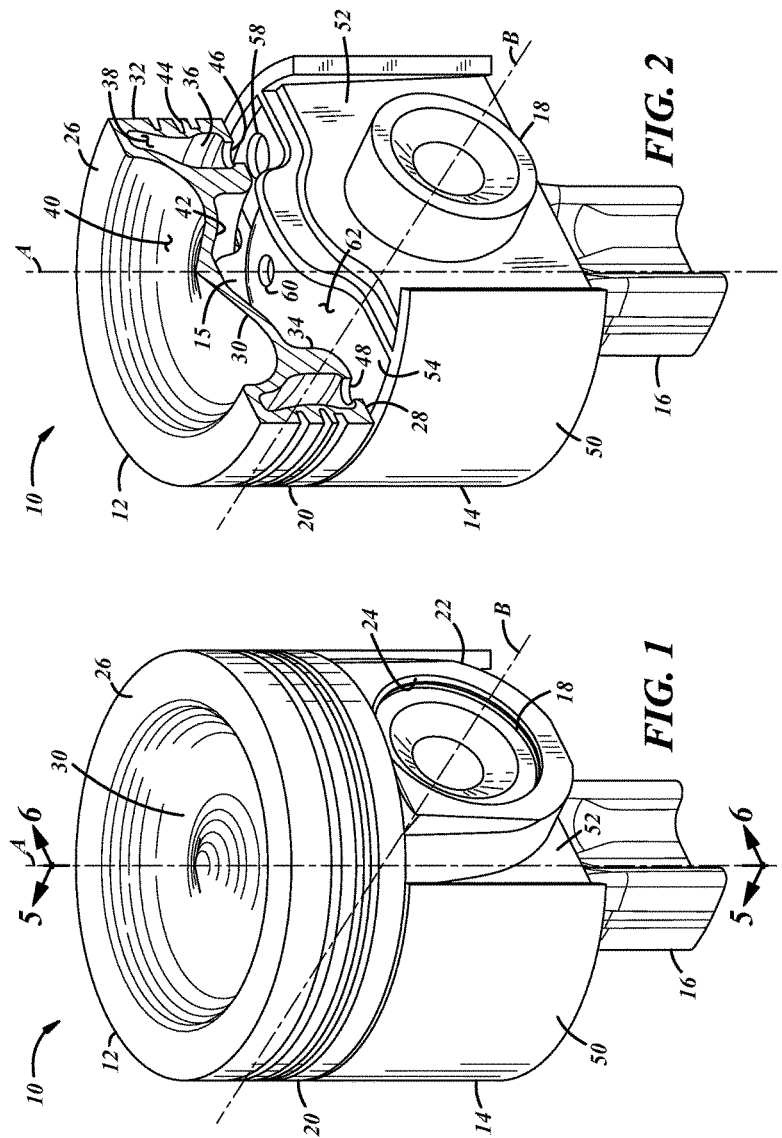

OIL-COOLED PISTON FOR AN INTERNAL COMBUSTION ENGINE

TECHNICAL FIELD

The present invention generally relates to a piston for an internal combustion engine, and more particularly, to an oil-cooled piston.

BACKGROUND

Reciprocating internal combustion engines include at least one cylinder with a piston located therein. A cylinder head overlies an upper end of the cylinder, and a combustion chamber is defined within the cylinder between the cylinder head and an upper portion or crown of the piston. Each piston is pivotally connected to a so-called small end of a connecting rod by a piston pin or wrist pin, and an opposite big end of each connecting rod is connected to a crankshaft. The piston moves up and down in the cylinder by forces produced in the combustion chamber during the operating cycle of the engine. The up and down movement of the piston is transferred via the connecting rod to the crankshaft, which converts the reciprocating movement of the piston into rotational energy.

During operation of the engine, the piston crown is repeatedly exposed to the high temperatures and pressures produced within the combustion chamber. To maintain the piston crown within a suitable operating temperature range, oil from the lubrication system of the engine is oftentimes used to cool the piston crown. For example, some pistons include an annular cooling chamber that extends around a periphery of the piston. Cooling oil is introduced into the annular cooling chamber in a variety of ways, and is splashed against the interior surfaces of the cooling chamber by the reciprocal movement of the piston in a "cocktail shaker" action.

SUMMARY

According to an aspect of the invention, there is provided a piston for an internal combustion engine. The piston comprises a piston head and an articulated piston skirt. The piston head includes a crown and pin bosses depending from the crown. The piston skirt includes opposed thrust walls, opposed sidewalls, and a transverse bridge. The transverse bridge extends diametrically across the piston skirt between the sidewalls. A circumferential cooling gallery is encompassed within an outer circumferential ring belt section of the crown. The circumferential cooling gallery is in fluid communication with a central cooling passage that extends between the crown of the piston head and the piston skirt. The central cooling passage extends diametrically across the piston skirt, beneath at least a portion of the ring belt section and beneath at least a portion of an inner combustion bowl section of the crown.

When used in a cylinder of a reciprocating internal combustion engine, the piston, as described above, can be maintained at a relatively cool temperature, as compared to prior art pistons exposed to the same combustion temperatures and pressures. In particular, the novel arrangement of the central cooling passage within the piston has the advantage of being particularly beneficial in cooling a central region of the crown, which is oftentimes exposed to the highest temperatures and pressures within the combustion chamber.

According to another aspect of the invention, there is provided an articulated piston skirt. The piston skirt comprises diametrically opposed arcuate thrust walls, opposed generally planar sidewalls, a transverse bridge, and lateral fins. The arcuate thrust walls extend in a generally longitudinal direction from an upper end to a lower end of the piston skirt. The generally planar sidewalls extend between the arcuate thrust walls. The transverse bridge extends diametrically across the piston skirt, from one of the arcuate thrust walls to another, between the generally planar sidewalls. The lateral fins extend in a generally upward direction from the bridge and in a generally lateral direction along the generally planar sidewalls. The transverse bridge is configured to at least partially define a central cooling passage that extends diametrically across the piston skirt, from one of the arcuate thrust walls to another.

The articulated piston skirt, as described above, may be used in combination with a piston head that includes a crown and pin bosses to form a piston for an internal combustion engine. The articulated piston skirt may be positioned beneath the crown of the piston head, with the generally planar sidewalls of the piston skirt being located radially inward of the pin bosses of the piston head.

The piston, as described above, including the articulated piston skirt and the piston head, may be used in combination with a connecting rod and a piston pin to form a piston assembly for an internal combustion engine. The connecting rod may have a small end that is positioned between the arcuate thrust walls and between the generally planar sidewalls of the piston skirt. The piston pin may extend through the pin bosses of the piston head, the generally planar sidewalls of the piston skirt, and the small end of the connecting rod to couple the piston head and the piston skirt to each other and to the connecting rod.

According to yet another aspect of the invention, there is provided a piston assembly for an internal combustion engine. The piston assembly comprises a piston head, an articulated piston skirt, and a piston pin. The piston pin couples the piston head and the piston skirt to each other and to a small end of a connecting rod. The piston head includes a crown and pin bosses. The pin bosses depend from the crown and have axially aligned pin bores. The piston skirt includes opposed thrust walls, opposed sidewalls, and a transverse bridge. The transverse bridge extends diametrically across the piston skirt, between the opposed sidewalls. Each of the opposed sidewalls of the piston skirt extends between one of the pin bosses of the piston head and the connecting rod.

The piston assembly, as described above, is relatively light weight and generally more robust than prior art piston assemblies.

BRIEF DESCRIPTION OF THE DRAWINGS

Preferred exemplary embodiments of the invention will hereinafter be described in conjunction with the appended drawings, wherein like designations denote like elements, and wherein:

FIG. 1 is a perspective view of an embodiment of a piston for an internal combustion engine comprising a piston head and a piston skirt, wherein the piston is connected to a small end of a connecting rod by a piston pin;

FIG. 2 is a partial cutaway view of the piston of FIG. 1;

DETAILED DESCRIPTION

Figure 4:
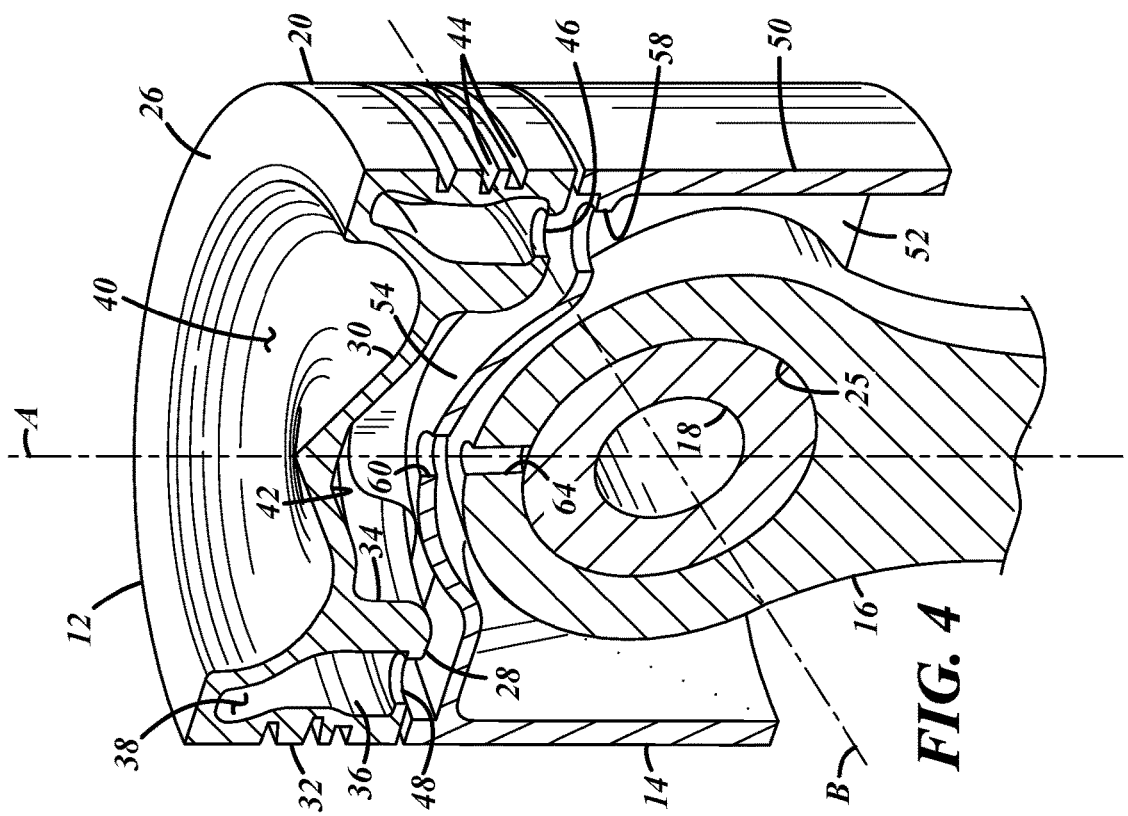
FIG. 4 is a cutaway view of the piston of FIG. 1.

FIGS. 1-6 illustrate an embodiment of an oil-cooled piston 10 for use in a cylinder (not shown) of a reciprocating internal combustion engine (not shown). The piston 10 has a central longitudinal axis A and comprises a piston head 12, an articulated piston skirt 14, and a central cooling passage 15 (FIG. 2) that extends between the piston head 12 and the piston skirt 14. Cooling oil flows through the central cooling passage 15 during operation of the engine and helps cool the piston head 12 and the piston skirt 14.

The piston head 12 and the piston skirt 14 are formed independently of each other and exist as discrete components of the piston 10. In assembly, the piston head 12 and the piston skirt 14 are connected to each other and to a small end of a connecting rod 16 by a piston pin 18. The piston head 12 and the piston skirt 14 may be formed of the same or different materials. In one specific embodiment, the piston head 12 may be made of steel and the piston skirt 14 may be made of aluminum or an aluminum alloy. The piston head 12 may be produced by forging. The piston skirt may be produced by any suitable casting method or by forging. The piston head 12 and the piston skirt 14 may not be in direct contact with each other during operation.

Figures 5, 6:
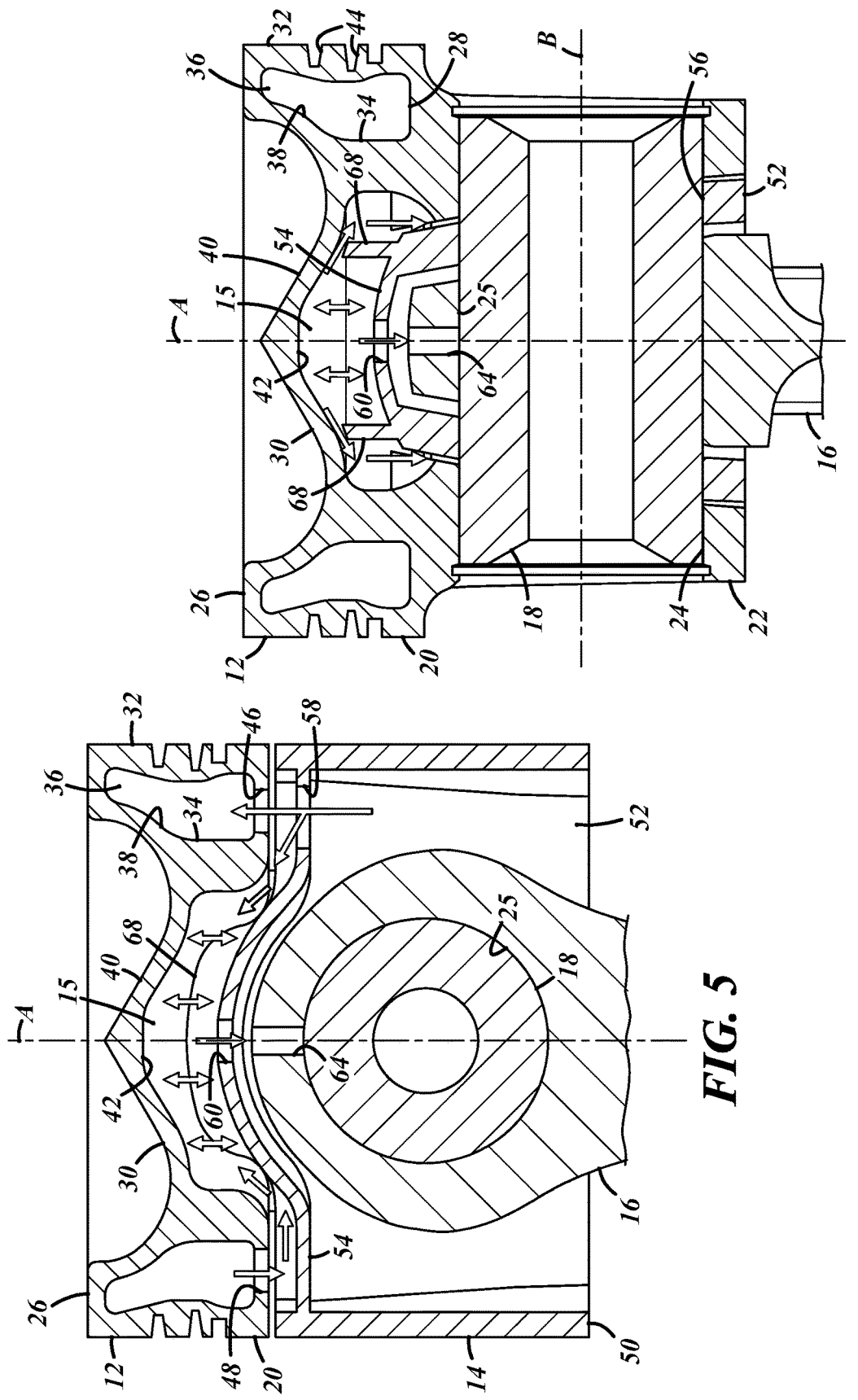
FIG. 5 is a cross-sectional view of the piston of FIG. 1 taken along line 5-5 of FIG. 1.
FIG. 6 is a cross-sectional view of the piston of FIG. 1 taken along line 6-6 of FIG. 1.

The piston head 12 defines an upper end of the piston 10 and includes a crown 20 and a pair of pin bosses 22 having upper and lower ends. The pin bosses 22 depend from the crown 20 and define a pair of laterally spaced pin bores 24. The pin bosses 22 are connected to a lower portion of the crown 20 at their upper ends and extend in a generally longitudinal direction from the lower portion of the crown 22 to their lower ends. The pin bosses 22 may be tapered at their lower ends (FIG. 6). The pin bores 24 are sized for receipt of the piston pin 18 and are axially aligned with each other and with a pin bore 25 (FIG. 4) of the connecting rod 16 along a pin bore axis B.

The pin bosses 22 may extend radially inward of the crown 20, with the outer diameter of the piston head 12 measured at the crown 20 being greater than the outer diameter of the piston head 12 measured at the pin bosses 22 (FIG. 6). For example, the outer diameter of the piston head 12 measured parallel to the pin bore axis B at the pin bosses 22 may be approximately 80-85% of the outer diameter of the piston head 12 measured at the crown 20, including all ranges and subranges therebetween. The upper ends of the pin bosses 22 may be spaced apart from each other at a distance equal to approximately 40-45% of the outer diameter of the crown 20, including all ranges and subranges therebetween.

The crown 20 of the piston head 12 has an outer circumferential ring belt section and an inner combustion bowl section. The ring belt section provides a seal between the piston head 12 and a wall of the cylinder, and the inner combustion bowl section at least partially defines a combustion chamber within the cylinder. As best shown in FIGS. 2 and 4, the crown 20 includes a circumferential upper wall 26, a circumferential lower wall 28, a combustion wall 30, an outer ring belt wall 32, an inner wall 34, and a circumferential cooling gallery 36.

The circumferential cooling gallery 36 is encompassed within the outer circumferential ring belt section of the crown 20 and extends from an upper portion to a lower portion of the crown 20. The circumferential cooling gallery 36 extends around a circumference of the crown 20 and is spaced radially inwardly of the outer ring belt wall 32 and radially outwardly of the inner wall 34. The circumferential cooling gallery 36 is in fluid communication with the central cooling passage 15 and has an interior surface 38, with each of the walls 26, 28, 30, 32, and 34 of the crown 20 defining a portion of the interior surface 38 of the cooling gallery 36. During operation of the engine, cooling oil flows through the circumferential cooling gallery 36 about a circumference of the crown 20 and helps remove excess heat from the outer circumferential ring belt section of the crown 20.

The cooling gallery 36 may have an inner diameter measured perpendicular to the central longitudinal axis A at the inner wall 34 of the crown 20 (FIGS. 5 and 6), and the inner diameter of the cooling gallery 36 may be equal to approximately 60-70% of the outer diameter of the crown 20, including all ranges and subranges therebetween. For example, in some embodiments, the inner diameter of the cooling gallery 36 may be equal to approximately 65-69% of the outer diameter of the crown 20, including all ranges and subranges therebetween.

The combustion wall 30 of the crown 20 has an upper surface 40 and a lower surface 42. During operation of the engine, the upper surface 40 of the combustion wall 30 is directly acted on by forces and heat produced in the combustion chamber of the cylinder, and the lower surface 42 is directly exposed to cooling oil flowing within the central cooling passage 15, as will be further discussed below. The ring belt wall 32 depends from the annular upper wall 26 and is radially spaced apart from the inner wall 34. The ring belt wall 32 has a radially outer surface and a radially inner surface and includes a plurality of grooves 44 extending radially inward from its outer surface for accommodating a plurality of piston rings (not shown).

The inner wall 34 of the crown 20 has a radially outer surface that faces toward the circumferential cooling gallery 36 and a radially inner surface that faces toward the central cooling passage 15, toward the central longitudinal axis A of the piston 10. The inner wall 34 extends in a generally downward direction from the combustion wall 30 to the lower wall 28, between the circumferential cooling gallery 36 and the central cooling passage 15.

The lower wall 28 is located at a lower end of the crown 20 and has an upper surface that faces toward the circumferential cooling gallery 36 and a lower surface that faces toward the central cooling passage 15 and toward the piston skirt 14. The lower wall 28 extends between the ring belt wall 32 and the inner wall 34. The lower wall 28 includes an inlet port 46 (FIG. 2) through which cooling oil is supplied to the circumferential cooling gallery 36 and an outlet port 48 (FIG. 2) through which cooling oil is discharged from the circumferential cooling gallery 36. The pin bosses 22 may be connected to the crown 20 at their upper ends and may extend in a generally longitudinal direction from the inner wall 34 and the lower wall 28 of the crown 20 to their lower ends.

Figure 3:
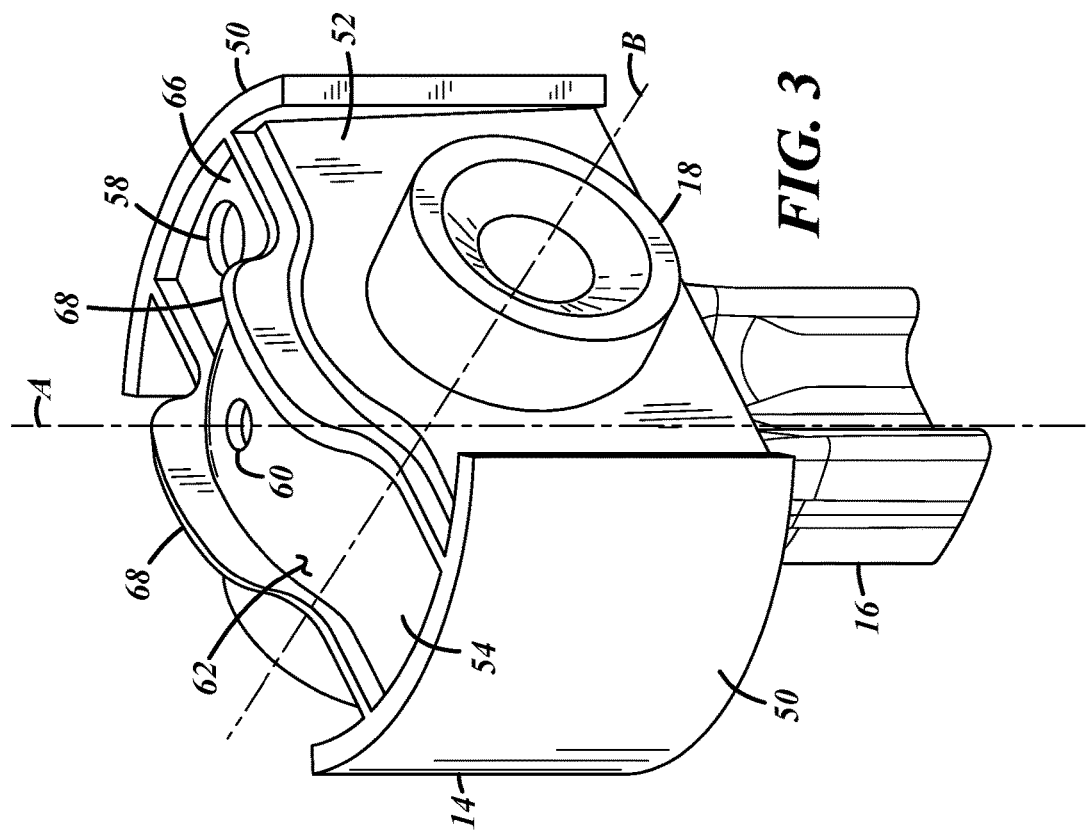
FIG. 3 is a perspective view of the piston skirt of FIG. 1.

The piston skirt 14 defines a lower end of the piston 10 and is located below the crown 20 of the piston head 12, partially between the pin bosses 22. As best shown in FIG. 3, the piston skirt 14 includes a pair of diametrically opposed thrust walls 50, a pair of opposed sidewalls 52, and a transverse bridge 54. The thrust walls 50 and the sidewalls 52 of the piston skirt 14 extend in a generally longitudinal direction from an upper end to a lower end of the piston skirt 14 and define a radially outer periphery of the piston skirt 14.

The thrust walls 50 are arcuate in shape and have exterior surfaces which confront an inner surface of the cylinder wall during operation of the engine. The thrust walls 50 have upper ends and lower ends, and the upper ends of the thrust walls 50 may be located below and spaced apart from a lower end of the ring belt wall 32 of the crown 20 by a relatively small gap (FIG. 5). For example, in some embodiments, the upper ends of the thrust walls 50 may be spaced apart from the lower end of the ring belt wall 32 by a gap in the range of 1 mm to 2 mm, including all ranges and subranges therebetween.

The sidewalls 52 of the piston skirt 14 are generally planar and extend in a lateral direction across the piston skirt 14, from one thrust wall 50 to another. As best shown in FIG. 6, the sidewalls 52 have upper ends and lower ends and flare radially outwardly from their upper to lower ends. Pin bores 56 (FIG. 6) are defined in the sidewalls 52 of the piston skirt 14. The pin bores 56 correspond to and are axially aligned with the pin bores 24 of the pin bosses 22. In assembly, the piston pin 18 extends through the pin bores 24 in the pin bosses 22 of the piston head 12 and the pin bores 56 in the sidewalls 52 of the piston skirt 14 to couple the piston head 12 and the piston skirt 14 to each other and to the connecting rod 16. The sidewalls 52 are located radially inward of the pin bosses 22 of the piston head 12, with each of the sidewalls 52 being disposed between one of the pin bosses 22 and the connecting rod 16. As such, each of the sidewalls 52 has an inner surface that faces toward the connecting rod 16 and an outer surface that faces toward one of the pin bosses 22 of the piston head 12. The outer surfaces of the sidewalls 52 may be spaced apart from the pin bosses 22 of the piston head 12 by a relatively small gap (FIG. 6). For example, in some embodiments, the outer surfaces of the sidewalls 52 may be spaced apart from the pin bosses 22 by a distance in the range of 1 mm to 2 mm, including all ranges and subranges therebetween.

The transverse bridge 54 is located at the upper end of the piston skirt 14 and extends beneath at least a portion of the ring belt section and beneath at least a portion of the combustion bowl section of the crown 20. As best shown in FIG. 3, the transverse bridge 54 extends diametrically across the piston skirt 14 perpendicular to the pin bore axis B, from one thrust wall 50 to another, in between the sidewalls 52. The transverse bridge 54 has an elevated central region and a pair of side regions that extend in radially opposite directions from the central region to the thrust walls 50. The elevated central region of the transverse bridge 54 may be spaced apart from the lower wall 28, the combustion wall 30, and/or the inner wall 34 of the crown 20 by a relatively small gap (FIGS. 5 and 6). For example, in some embodiments, the elevated central region of the transverse bridge 54 may be spaced apart from the lower wall 28, the combustion wall 30, and/or the inner wall 34 of the crown 20 by a distance in the range of 5 mm to 7 mm, including all ranges and subranges therebetween.

The transverse bridge 54 includes an inlet opening 58, a drain 60, and a transverse flow surface 62 over which cooling oil can flow during operation of the engine. The transverse flow surface 62 may extend diametrically across the piston skirt 14, over the entire transverse bridge 54, from one thrust wall 50 to another. The inlet opening 58 in the bridge 54 provides an ingress point through which cooling oil can be supplied to the central cooling passage 15. The inlet opening 58 may be located in one of the side regions of the transverse bridge 54 and may be located beneath the inlet port 46 in the lower wall 28 of the crown 20. In particular, the inlet opening 58 may at least partially overlap with the inlet port 46 in the lower wall 28 of the crown 20 so that cooling oil may be substantially simultaneously supplied to the central cooling passage 15 and to the circumferential cooling gallery 36, as indicated by the arrows illustrated in FIG. 5. The inlet opening 58 may have a larger diameter than the inlet port 46, and may have a central axis that is somewhat misaligned with a central axis of the inlet port 46. In such case, the central axis of the inlet opening 58 may be located radially inward of the central axis of the inlet port 46, towards the central longitudinal axis A of the piston 10. The drain 60 in the bridge 54 provides an egress point through which cooling oil can be discharged from the central cooling passage 15. The drain 60 may be located in the central region of the bridge 54 and may be in axial alignment with a hole 64 located in an upper end of the connecting rod 16 so that cooling oil exiting the central cooling passage 15 can be introduced into a gap between the pin bore 25 of the connecting rod 16 and the piston pin 18 to help lubricate the pin bore 25 and the piston pin 18.

A central channel 66 (FIG. 3) is defined above the flow surface 62 of the bridge 54 and is bounded on opposite sides by a pair of lateral fins 68 that extend in a generally lateral direction along the sidewalls 52 of the skirt 14. The fins 68 also extend in a generally upward direction from the bridge 54, toward the crown 20, to a pair of free ends. In particular, the free ends of the fins 68 may extend from the bridge 54 toward the lower surface 42 of the combustion wall 30, and may be spaced apart from the combustion wall 30 by a relatively small gap. For example, in some embodiments, the free ends of the fins 68 may be spaced apart from the lower surface 42 of the combustion wall 30 by a distance in the range of 2 mm to 4 mm, including all ranges and subranges therebetween. The central channel 66 allows cooling oil to collect above the bridge 54 within the central cooling passage 15 of the piston 10 so that a sufficient amount of cooling oil is continuously available within the central cooling passage 15 for cooling the combustion bowl section of the crown 20. The fins 68 may be configured to maintain a desired level of cooling oil within the channel 66, above the flow surface 62 of the bridge 54.

The central cooling passage 15 is disposed between the crown 20 of the piston head 12 and the piston skirt 14, and extends in a generally lateral direction beneath at least a portion of the outer circumferential ring belt section and beneath at least a portion of the inner combustion bowl section of the crown 20. More specifically, the cooling passage 15 extends beneath at least a portion of the lower wall 28 of the crown 20, beneath at least a portion of the circumferential cooling gallery 36, and beneath at least a portion of the combustion wall 30. The cooling passage 15 extends above the piston skirt 14 and diametrically across the piston skirt 14, from one thrust wall 50 to another. The cooling passage 15 is bounded by the lower surface 42 of the combustion wall 30, the radially inner surface of the inner wall 34, the lower surface of the lower wall 28, the upper ends of the pin bosses 22, and the transverse flow surface 62 of the bridge 54. The fins 68 extend in a generally upward direction from the bridge 54 into the central cooling passage 15 and help direct the flow of cooling oil in the passage 15 toward the crown 20.

The cooling passage 15 may have a width measured parallel to the pin bore axis B at the inner wall 34 of the crown 20 (FIG. 6), and the width of the cooling passage 15 may be equal to approximately 45-55% of the outer diameter of the crown 20, including all ranges and subranges therebetween. For example, in some embodiments, the width of the cooling passage 15 may be equal to approximately 48-52% of the outer diameter of the crown 20, including all ranges and subranges therebetween.

Referring now to FIGS. 5 and 6, cooling oil may be ejected from a cooling oil nozzle (not shown) toward the opening 58 in the bridge 54 and introduced into the central cooling passage 15 via the opening 58 and into the circumferential cooling gallery 36 via the inlet port 46 at substantially the same time. The cooling oil introduced into the circumferential cooling gallery 36 may flow through the gallery 36 about at least a portion of the circumference of the crown 20. In addition, during operation of the engine, the reciprocal movement of the piston 10 may cause the cooling oil within the cooling gallery 36 to be shaken and splashed on the entire interior surface 38 of the cooling gallery 36. As the cooling oil flows through the cooling gallery 36 and is splashed on the interior surface 38, heat is transferred from the relatively hot ring belt section of the crown 20 to the relatively cool oil, which helps to cool the ring belt section of the crown 20.

Cooling oil may be introduced into the central cooling passage 15 by the cooling oil nozzle and also may be dropped from the circumferential cooling gallery 36 into the cooling passage 15 via the outlet port 48. The cooling oil introduced into the central cooling passage 15 may be shaken by the reciprocal movement of the piston 10 and splashed along the lower surface 42 of the combustion wall 30 to transfer heat away from the relatively hot combustion bowl section of the crown 20 to the relatively cool oil to help cool the combustion bowl section of the crown 20. The fins 68 may help ensure that a suitable amount of cooling oil is continuously maintained within the channel 66 of the bridge 54 and thus in close proximity to the lower surface 42 of the combustion wall 30 for continuous cooling of the combustion wall 30.

Cooling oil introduced into the central cooling passage 15 may flow over the transverse flow surface 62 of the bridge 54 from one of the side regions of the bridge 54 toward the central longitudinal axis A of the piston 10 and to the elevated central region of the bridge 54. Some of the cooling oil that reaches the elevated central region of the bridge 54 may drop through the drain 60 and into the hole 64 in the connecting rod 16 to help lubricate the pin bore 25 of the connecting rod 16 and the piston pin 18. In addition, some of the cooling oil flowing over the transverse flow surface 62 of the bridge 54 may flow radially outwardly from the central longitudinal axis A of the piston 10, over the fins 68 and down the outer surfaces of the sidewalls 52. The cooling oil may flow down the outer surfaces of the sidewalls 52 between the pin bosses 22 of the piston head 12 and the sidewalls 52 of the piston skirt 14 and may help lubricate the pin bores 24 of the pin bosses 22 and the pin bores 56 of the piston skirt 14, as well as the piston pin 18. The fins 68 extend in a generally upward direction from the bridge 54 toward the lower surface 42 of the combustion wall 30 and may help direct cooling oil flowing over the bridge 54 toward the lower surface 42 of the combustion wall 30 before the cooling oil flows over the fins 68 and down the outer surfaces of the sidewalls 52. Thereafter, the cooling oil may drop from the piston 10, for example, into a crankcase (not shown).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A piston for an internal combustion engine, comprising:
   a piston head including a crown and pin bosses depending from said crown, said crown having an outer circumferential ring belt section and an inner combustion bowl section;
   an articulated piston skirt including opposed thrust walls, opposed sidewalls, and a transverse bridge extending diametrically across said piston skirt between said opposed sidewalls;
   a circumferential cooling gallery encompassed within said ring belt section of said crown; and
   a central cooling passage in fluid communication with said circumferential cooling gallery, said cooling passage extending between said crown of said piston head and said piston skirt and extending diametrically across said piston skirt, beneath at least a portion of said ring belt section and beneath at least a portion of said combustion bowl section of said crown,
   wherein said transverse bridge has an elevated central region, side regions extending in radially opposite directions from said central region toward said thrust walls, and a drain in said central region through which cooling oil can flow from said central cooling passage into a pin bore gap.

2. The piston set forth in claim 1 wherein said opposed thrust walls are arcuate in shape and said opposed sidewalls are generally planar.

3. The piston set forth in claim 1 wherein said piston head is made of steel and said piston skirt is made of aluminum or an aluminum alloy.

4. The piston set forth in claim 1 wherein said opposed sidewalls of said skirt are located radially inward of said pin bosses of said piston head.

5. The piston set forth in claim 1 wherein said central cooling passage is at least partially defined by a lower surface of said ring belt section of said crown, a lower surface of said combustion bowl section of said crown, and a transverse flow surface of said transverse bridge of said piston skirt.

6. The piston set forth in claim 1 wherein said transverse bridge includes lateral fins that extend in a generally lateral direction along said opposed sidewalls of said piston skirt.

7. The piston set forth in claim 6 wherein said lateral fins extend in a generally upward direction from said bridge, toward said crown, to free ends.

8. The piston set forth in claim 7 wherein said free ends of said lateral fins are spaced from a lower surface of said combustion bowl section of said crown by a gap in the range of 2 mm to 4 mm.

9. The piston set forth in claim 1 wherein one of said side regions of said bridge includes an inlet opening through which cooling oil can be introduced into said central cooling passage.

10. The piston set forth in claim 9 wherein said ring belt section of said crown includes an inlet port through which cooling oil can be introduced into said circumferential cooling gallery and an outlet port through which cooling oil can be discharged from said circumferential cooling gallery.

11. The piston set forth in claim 10 wherein said inlet opening in said side region of said bridge is located beneath said inlet port in said ring belt section of said crown and at least partially overlaps with said inlet port.

12. An articulated piston skirt, comprising:
diametrically opposed arcuate thrust walls extending in a generally longitudinal direction from an upper end to a lower end of said piston skirt;
opposed generally planar sidewalls extending across said piston skirt, from one arcuate thrust wall to another and from said upper end to said lower end of said piston skirt;
a transverse bridge extending diametrically across said piston skirt, from one of said arcuate thrust walls to another, between said generally planar sidewalls, said transverse bridge including a transverse flow surface over which cooling oil can flow from one of said arcuate thrust walls to another;
lateral fins extending in a generally upward direction from said bridge and in a generally lateral direction along said generally planar sidewalls; and
a central channel defined above said transverse flow surface of said transverse bridge and bounded on opposite sides by said lateral fins,
wherein said transverse bridge is configured to at least partially define a central cooling passage that extends diametrically across said piston skirt, from one of said arcuate thrust walls to another.

13. The piston skirt set forth in claim 12 wherein said arcuate thrust walls and said generally planar sidewalls define a radially outer periphery of said skirt.

14. The piston skirt set forth in claim 12 wherein said transverse bridge has an elevated central region, side regions that extend in radially opposite directions away from said central region to said arcuate thrust walls, and a drain in said central region through which cooling oil can flow.

15. The piston skirt set forth in claim 12 comprising axially aligned pin bores defined in said generally planar sidewalls.

16. A piston for an internal combustion engine, comprising:
the piston skirt of claim 12;
a piston head including a crown and pin bosses, said crown of said piston head comprising an outer circumferential ring belt section and an inner combustion bowl section, and each of said pin bosses depending from said crown and defining a pin bore; and
a circumferential cooling gallery encompassed within said ring belt section of said crown,
wherein said articulated piston skirt is positioned beneath said crown of said piston head, and said generally planar sidewalls of said piston skirt are located radially inward of said pin bosses of said piston head,
wherein said lateral fins extend in a generally upward direction from said bridge, toward said crown, to free ends, and
wherein said free ends of said lateral fins are spaced apart from a lower surface of said inner combustion bowl section of said crown.

17. The piston set forth in claim 16 comprising a central cooling passage, said cooling passage being at least partially defined by a lower surface of said ring belt section of said crown, said lower surface of said combustion bowl section of said crown, and said transverse flow surface of said transverse bridge of said piston skirt.

18. The piston set forth in claim 17 wherein said arcuate thrust walls of said piston skirt have upper ends located below and spaced apart from said lower surface of said ring belt section of said crown, and wherein said central channel extends between said upper ends of said thrust walls and is configured to collect cooling oil above said transverse flow surface of said transverse bridge within said central cooling passage.

19. A piston assembly for an internal combustion engine, comprising:
the piston of claim 16, wherein axially aligned pin bores are defined in said generally planar sidewalls of said piston skirt;
a connecting rod having a small end that defines a pin bore, said small end of said connecting rod being positioned between said arcuate thrust walls and between said generally planar sidewalls of said piston skirt; and
a piston pin extending through said pin bores of said piston head, said pin bores of said piston skirt, and said pin bore of said connecting rod.

20. A piston assembly for an internal combustion engine, comprising:
a piston head including a crown and pin bosses depending from said crown, said pin bosses having axially aligned pin bores, and said crown comprising a circumferential upper wall, a circumferential lower wall, a combustion wall, an outer ring belt wall, and an annular inner wall, wherein said outer ring belt wall and said annular inner wall respectively depend from said circumferential upper wall and said combustion wall to said circumferential lower wall of said crown and are radially spaced apart from each other;
an articulated piston skirt including opposed thrust walls, opposed sidewalls having axially aligned pin bores, and a transverse bridge extending diametrically across said piston skirt, from one of said thrust walls to another, between said sidewalls;
a piston pin that couples said piston head and said piston skirt to each other;
a central cooling passage extending between said crown of said piston head and said piston skirt, and extending beneath said combustion wall and said circumferential lower wall of said crown; and
a circumferential cooling gallery encompassed within said crown of said piston head and disposed between said circumferential upper wall and said circumferential lower wall and between said outer ring belt wall and said annular inner wall of said crown,
wherein said piston head and said piston skirt comprise discrete components of said piston assembly.

21. The piston assembly set forth in claim 20 wherein said pin bosses of said piston head are located radially outwardly of said opposed sidewalls of said piston skirt.

22. The piston assembly set forth in claim 20 wherein said piston head and said piston skirt are not in direct contact with each other and are separated from each other by a gap in the range of 1-2 mm.

23. The piston assembly set forth in claim 20 wherein said crown of said piston head comprises an outer circumferential ring belt section and an inner combustion bowl section, and wherein said central cooling passage extends beneath at least a portion of said ring belt section and at least a portion of said combustion bowl section of said crown.

24. The piston assembly set forth in claim 20 wherein said piston pin couples said piston head and said piston skirt to a small end of a connecting rod, and wherein each of said opposed sidewalls of said piston skirt extends between one of said pin bosses of said piston head and said connecting rod.

25. The piston assembly set forth in claim 20 wherein said annular inner wall of said crown extends between said circumferential cooling gallery and said central cooling passage and has a radially outer surface that faces toward said circumferential cooling gallery and an opposite radially inner surface that faces toward said central cooling passage, and wherein said circumferential cooling gallery is in fluid communication with said central cooling passage via a port in said circumferential lower wall of said crown.

26. The piston assembly set forth in claim 20 wherein said transverse bridge of said piston skirt has an elevated central region and side regions that extend in radially opposite directions away from said central region to said thrust walls, and wherein said transverse bridge includes a drain in said central region through which cooling oil can flow from said central cooling passage into a pin bore gap.

27. The piston assembly set forth in claim 20 wherein said transverse bridge of said piston skirt includes a transverse flow surface over which cooling oil can flow from one of said thrust walls to another, a central channel is defined above said flow surface of said transverse bridge that extends from one of said thrust walls to another and is bounded on opposite sides by a pair of lateral fins that extend along said sidewalls of said piston skirt in a generally upward direction from said transverse bridge, toward a lower surface of said combustion wall of said crown, to free ends, and wherein said free ends of said lateral fins are spaced apart from said lower surface of said combustion wall of said crown.

* * * * *